United States Patent
Lee et al.

(10) Patent No.: US 8,814,131 B2
(45) Date of Patent: Aug. 26, 2014

(54) GAS CONTROL UNIT FOR BOILER

(75) Inventors: Chang-Hoon Lee, Busan (KR); Kuk-Chan Moon, Busan (KR); Seong-Jun Kim, Gyeongsangnam-do (KR); Kang-Woo Park, Gyeongsangnam-do (KR)

(73) Assignee: Unick Corporation, Busan (KR)

( * ) Notice: Subject to any disclaimer, the term of this patent is extended or adjusted under 35 U.S.C. 154(b) by 0 days.

(21) Appl. No.: 13/996,543

(22) PCT Filed: Nov. 29, 2011

(86) PCT No.: PCT/KR2011/009149
§ 371 (c)(1),
(2), (4) Date: Jun. 20, 2013

(87) PCT Pub. No.: WO2012/086936
PCT Pub. Date: Jun. 28, 2012

(65) Prior Publication Data
US 2013/0277588 A1 Oct. 24, 2013

(30) Foreign Application Priority Data

Dec. 21, 2010 (KR) .......................... 10-2010-0131631
Nov. 7, 2011 (KR) .......................... 10-2011-0115028

(51) Int. Cl.
*F16K 31/02* (2006.01)
(52) U.S. Cl.
USPC ...................... 251/86; 251/129.15; 251/335.3
(58) Field of Classification Search
USPC ......... 251/84–88, 129.15, 129.19, 335.3, 337
See application file for complete search history.

(56) References Cited

U.S. PATENT DOCUMENTS

| 2,596,409 | A | * | 5/1952 | Johnson et al. ................. 251/86 |
| 2,735,047 | A | * | 2/1956 | Garner et al. ................... 251/86 |
| 2,875,975 | A | * | 3/1959 | Hajny ............................. 251/86 |
| 3,326,513 | A | * | 6/1967 | Hall ............................... 251/86 |
| 4,085,921 | A | * | 4/1978 | Ueda et al. ................ 251/129.08 |
| 4,475,711 | A | * | 10/1984 | Rountry .......................... 251/85 |
| 4,647,011 | A | * | 3/1987 | Contzen et al. .......... 251/129.15 |

FOREIGN PATENT DOCUMENTS

| JP | 64012978 U | 1/1989 |
| JP | 06001955 U | 1/1994 |
| JP | 07010661 U | 2/1995 |
| JP | 2000257741 A | 9/2000 |
| KR | 2010001600 A | 1/2010 |
| WO | WO 2009/054009 A2 * | 4/2009 |

OTHER PUBLICATIONS

International Search Report of Korean Intellectual Property Office in application No. PCT/KR2011/009149 dated Jul. 12, 2012.

* cited by examiner

*Primary Examiner* — John Bastianelli
(74) *Attorney, Agent, or Firm* — Kinney & Lange, P.A.

(57) ABSTRACT

A gas control unit for a boiler includes a hollow housing; a solenoid; a rod; opening and shutting means that is disposed at the lower end of the rod to open and shut a gas outlet; and a spring between the housing and the opening and shutting means so as to elastically urge it downward. A coupling member is formed at the lower end of the rod and a coupling groove into which the coupling member is inserted is formed in the opening and shutting means so as to allow movement. The opening and shutting means is coupled to the rod through the use of the coupling member and the coupling groove, the opening and shutting means can move within a predetermined range about the coupling member with an application of an external force.

6 Claims, 6 Drawing Sheets

GAS CONTROL UNIT FOR BOILER

BACKGROUND

The present invention relates to a gas control unit for a boiler, and more particularly, to a gas control unit for a boiler which can satisfactorily supply and shut off gas and which is not in danger of gas leakage.

In general, a boiler is an apparatus that heats water using combustion heat generated in combusting a fuel and supplies heated water or steam to necessary places. Boilers are classified into household boilers and industrial boilers depending on uses thereof, are classified into small-capacity boilers used at home or the like and large-capacity boilers used in power plants or the like depending on capacity thereof, and are classified into oil-fired boilers and gas-fired boilers depending on fuels to be used.

In the gas-fired boilers using gas as a fuel out of the boilers, sparks are generated to ignite using an ignition transformer and an ignition rod and supplied gas is combusted to heat water. Such gas-fired boilers should adjust an amount of gas to be supplied depending on an amount of inflow air, for the purpose of perfect combustion of the gas.

On the other hand, a gas control unit adjusting the amount of gas to be supplied depending on the amount of air is electromagnetically controlled to supply an appropriate amount of gas depending on the amount of inflow air. That is, a sensor disposed in an air inlet through which air flows in senses an amount of inflow air and transmits the sensed result to a controller such as a microcomputer, and the controller supplies gas so as to correspond to a predetermined mixing ratio depending on the amount of inflow air. For example, the amount of gas to be supplied is controlled to increase when the amount of air to flow from the outside is large and the amount of gas to be supplied is controlled to decrease when the amount of air to flow is small, thereby keeping the mixing ratio of gas and air constant.

The invention relates to a gas control unit that is disposed in a boiler and that controls an amount of gas to be supplied depending on an amount of air. Referring to the prior art (Korean Patent Publication No. 10-2010-0001600, registered on Dec. 23, 2009), a valve according to the prior art has the following problem.

First, the valve according to the prior art has a structure in which a degree of opening of a gas outlet depending on the depth by which a gas discharge control section is inserted into the gas outlet. Accordingly, when the center of the gas discharge control section and the center of the gas outlet slightly depart from each other, it is not easy to control the degree of opening of the gas outlet. Particularly, when a manufacturing tolerance or an assembly error occurs between the outer diameter of the gas discharge control section and the inner diameter of the gas outlet, it is not easy to shut the gas outlet.

Second, the valve according to the prior art has a structure in which a diaphragm for preventing gas leakage is inserted into and fixed to an attachment groove of the gas discharge control section. Accordingly, when the gas discharge control section is often shifted, the diaphragm inserted into the attachment groove may be in danger of departure. In this case, gas may leak to cause a safety accident.

SUMMARY

The invention is made to solve the above-mentioned problem in the prior art. A technical goal of the invention is to provide a gas control unit for a boiler which can shut a gas outlet even when opening and shutting means and the gas outlet depart in center from each other and which can satisfactorily supply and shut off gas.

Another technical goal of the invention is to provide a gas control unit for a boiler which can perfectly prevent gas leakage from the gas control unit to enhance safety thereof.

According to an aspect of the invention, there is provided a gas control unit for a boiler including: a hollow housing; a solenoid that is disposed in the housing; a rod that is inserted into the solenoid and that has a lower part protruding from the housing; opening and shutting means that is disposed at the lower end of the rod so as to open and shut a gas outlet; and a spring that is disposed between the housing and the opening and shutting means so as to elastically urge the opening and shutting means downward. Here, a coupling member is formed at the lower end of the rod and a coupling groove into which the coupling member is inserted is formed in the opening and shutting means so as to allow the opening and shutting means to move.

According to this configuration, since the opening and shutting means are coupled to the rod through the use of the coupling member and the coupling groove, the opening and shutting means can move in a predetermined range about the coupling member with an application of an external force.

According to the invention having the above-mentioned configuration, since the opening and shutting means opening and shutting the gas outlet can move at the lower end of the rod, it is possible to shut the gas outlet to satisfactorily control the supply and shut-off of gas even when the opening and shutting means and the gas outlet depart in center from each other.

The gas control unit for a boiler according to the invention may further include a bellows that is disposed inside or outside of the spring and that is stretched or contracted with the movement of the rod. When the bellows is added, it is possible to perfectly shut off the gas leakage from the gas control unit for a boiler, thereby enhancing the safety.

DETAILED DESCRIPTION

Exemplary embodiments of the invention will be described below in detail with reference to the accompanying drawings. In the following description of the exemplary embodiments of the invention, like elements in different drawings are referenced by like reference signs.

Figure 1:
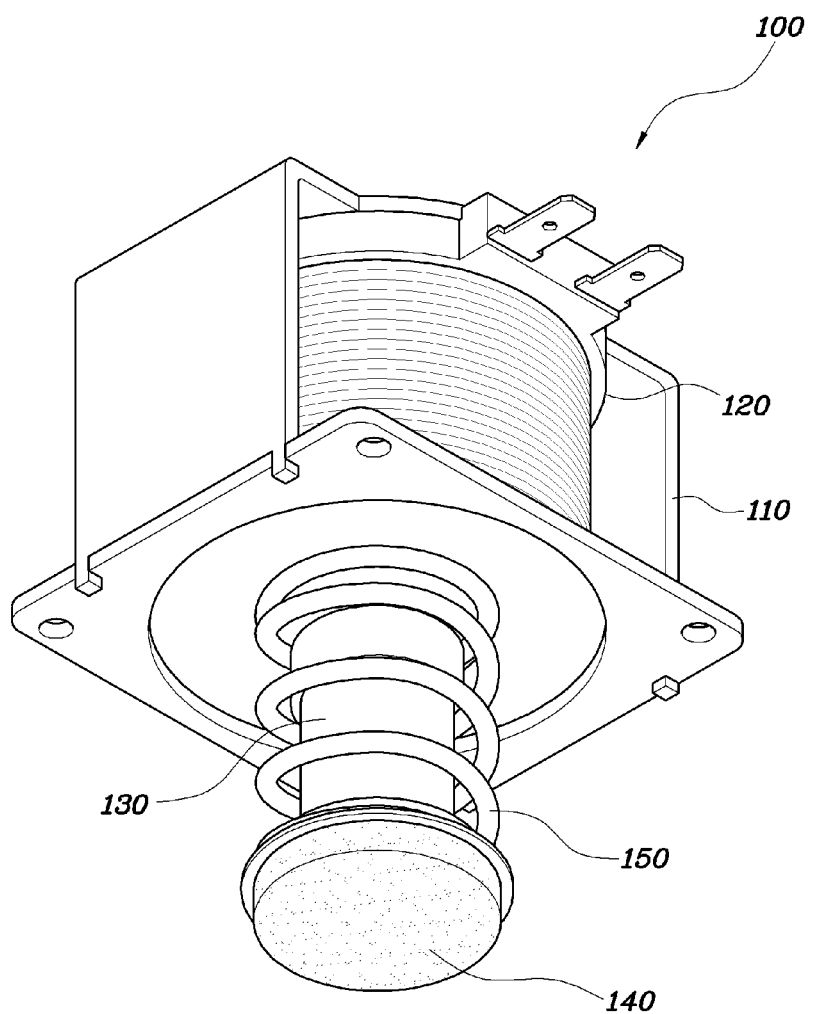
FIG. 1 is a perspective view of a gas control unit for a boiler according to an embodiment of the invention.
Figure 2:
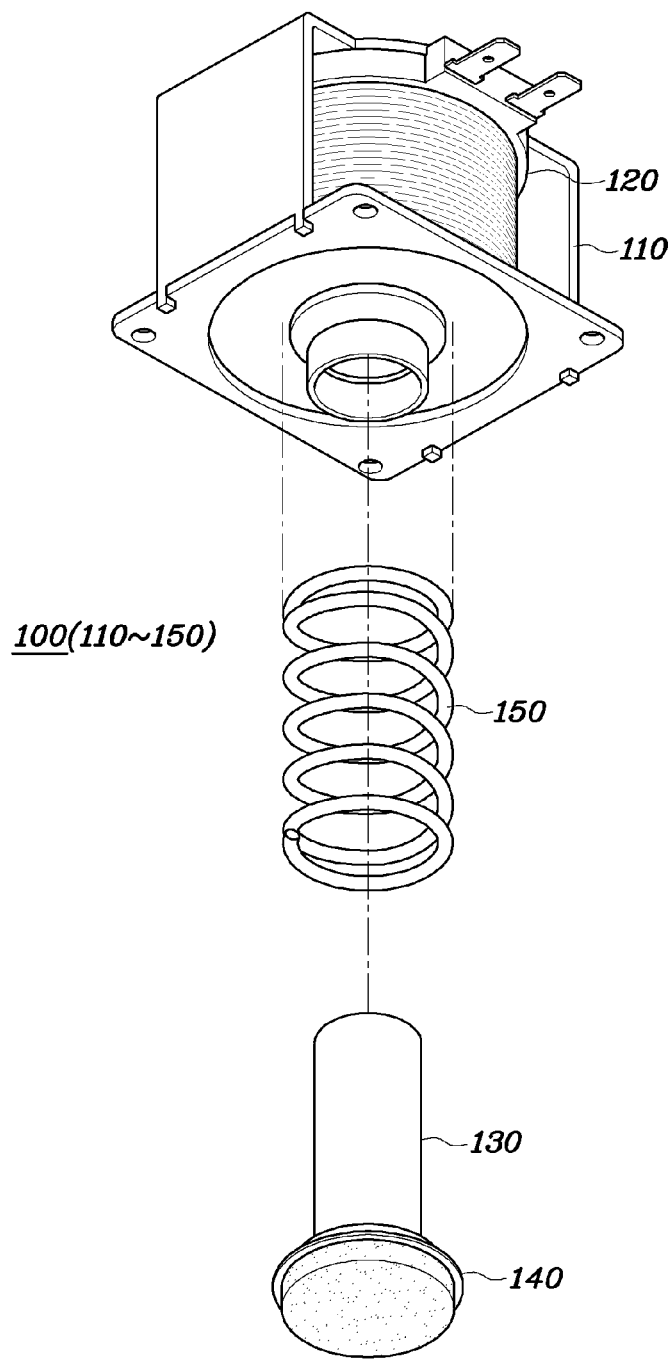
FIG. 2 is an exploded perspective view of the gas control unit for a boiler according to the embodiment of the invention.

As shown in FIGS. 1 and 2, a gas control unit 100 for a boiler according to an embodiment of the invention includes a housing 110, a solenoid 120 disposed in the housing 110, a rod 130 disposed in the solenoid 120, opening and shutting means 140 disposed at a lower end of the rod 130, and a spring 150 disposed between the housing 110 and the opening and shutting means 140.

Figure 3:
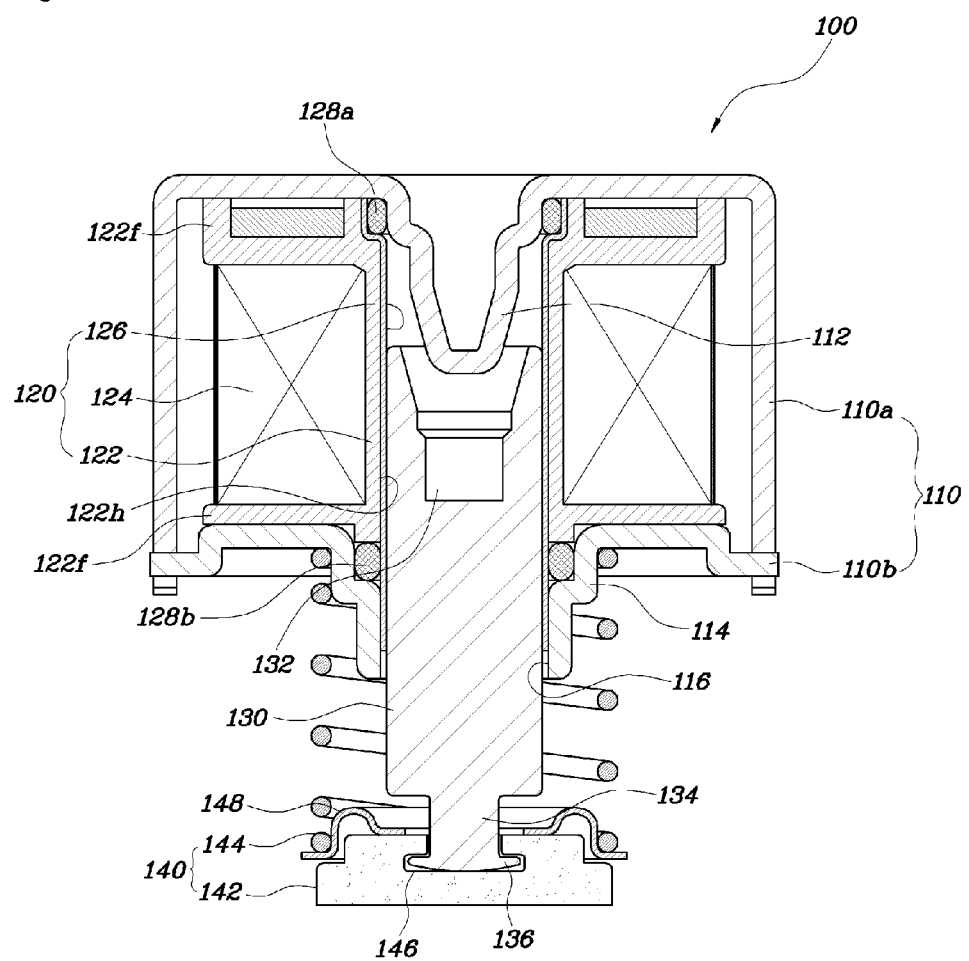
FIG. 3 is a sectional view of the gas control unit for a boiler according to the embodiment of the invention.

The elements 110 to 150 will be described in more detail below with reference to FIG. 3.

The housing 110 includes a ⊂-shaped first plate 110a of which the bottom surface is opened and a panel-shaped second plate 110b coupled to the opened bottom surface of the first plate 110a. The housing 110 having this configuration forms a hollow rectangular parallelepiped of which the front and rear surfaces are opened and the solenoid 120 is disposed therein. At this time, a magnetic induction protrusion 112 that protrudes into the inside of the solenoid 120 is formed at the center of the first plate 110a. A multi-stage first attachment protrusion 114 into which the top end of the spring 150 is inserted is formed at the center of the second plate 110b and a through-hole 116 through which the rod 130 is inserted is formed at the center of the first attachment protrusion 114.

Here, the magnetic induction protrusion 112 is a fixed core used to cause the rod 130 as a movable core to move when the solenoid 120 is supplied with power. The magnetic induction protrusion 112 is formed in a cone shape on which a magnetic field generated from the coil 124 can be concentrated so as to easily raise the rod 130 when it is supplied with power. The magnetic induction protrusion 112 is preferably formed by forging the first plate 110a, which is intended to remove a clearance from which gas leaks by forming the magnetic induction protrusion 112 and the first plate 110a as a body through the use of forging.

The solenoid 120 includes a bobbin 122, a coil 124 wound on the outer circumferential surface of the bobbin 122, and a guide 126 disposed inside the bobbin 122. The bobbin 122 has a spool shape in which flanges 122f are formed at the top and bottom ends thereof and the coil 124 generating a magnetic field is disposed between the pair of flanges 112f. An insertion hole 122h penetrating the top surface and the bottom surface is formed in the bobbin 112. The magnetic induction protrusion 112 and the rod 130 are inserted into the insertion hole 122h from the upside and the downside. The guide 126 has a tubular shape to be in close contact with the inner wall of the insertion hole 122h and has a length extending from the top end of the bobbin 122 and the first attachment protrusion 114.

The solenoid 120 having the above-mentioned configuration includes O-rings 128a and 128b for preventing gas leakage. That is, the first O-ring 128a is disposed between the top inner circumferential surface of the guide 126 and the outer circumferential surface of the magnetic induction protrusion 112 and the second O-ring 128b is disposed between the bottom outer circumferential surface of the guide 126 and the inner circumferential surface of the first attachment protrusion 114.

The rod 130 is a metal rod that can move with a magnetic field generated from the coil 124. A magnetic induction groove 132 corresponding to the magnetic induction protrusion 112 is formed on the top surface of the rod 130. An extension 134 protrudes from the bottom surface and a coupling member 136 is formed at the bottom end of the extension 134. Here, the magnetic induction groove 132 is a part on which the magnetic field generated from the coil 124 is concentrated so as to easily raise the rod 130 with the supply of power. The extension 134 and the coupling member 136 serve to allow the opening and shutting means 140 to move with the application of an external force. The extension 134 has a diameter smaller than that of the rod 130 so as not to cause interference when the opening and shutting means 140 moves, and has a predetermined length. The bottom surface of the coupling member 136 is curved so as not to cause interference inside the coupling groove 146 formed in the opening and shutting means 140.

The opening and shutting means 140 includes an elastic pad 142 disposed in the coupling member 136 of the rod 130 and a cover 144 disposed on the top of the elastic pad 144. The elastic pad 142 is formed of a material having predetermined elasticity so as to perfectly seal a gas outlet (200 in FIG. 4) and to absorb a contact impact with the gas outlet (200 in FIG. 4). A coupling groove 146 into which the coupling member 136 is inserted is formed in the elastic pad 142. The opening of the coupling groove 146 is formed with a diameter sufficient to cover the top surface of the coupling member 136. The cover 144 includes a second attachment protrusion 148 to which the bottom end of the spring 150 is inserted.

The spring 150 serves to elastically support the opening and shutting means 140 coupled to the rod 130 to the downside and to prevent the rod 120 from being separated from the solenoid 120. For this purpose, the top end of the spring 150 is inserted and fixed onto the first attachment protrusion 114 formed in the second plate 110b and the bottom end thereof is inserted and fixed onto the second attachment protrusion 148 formed in the cover 144.

Figure 4:
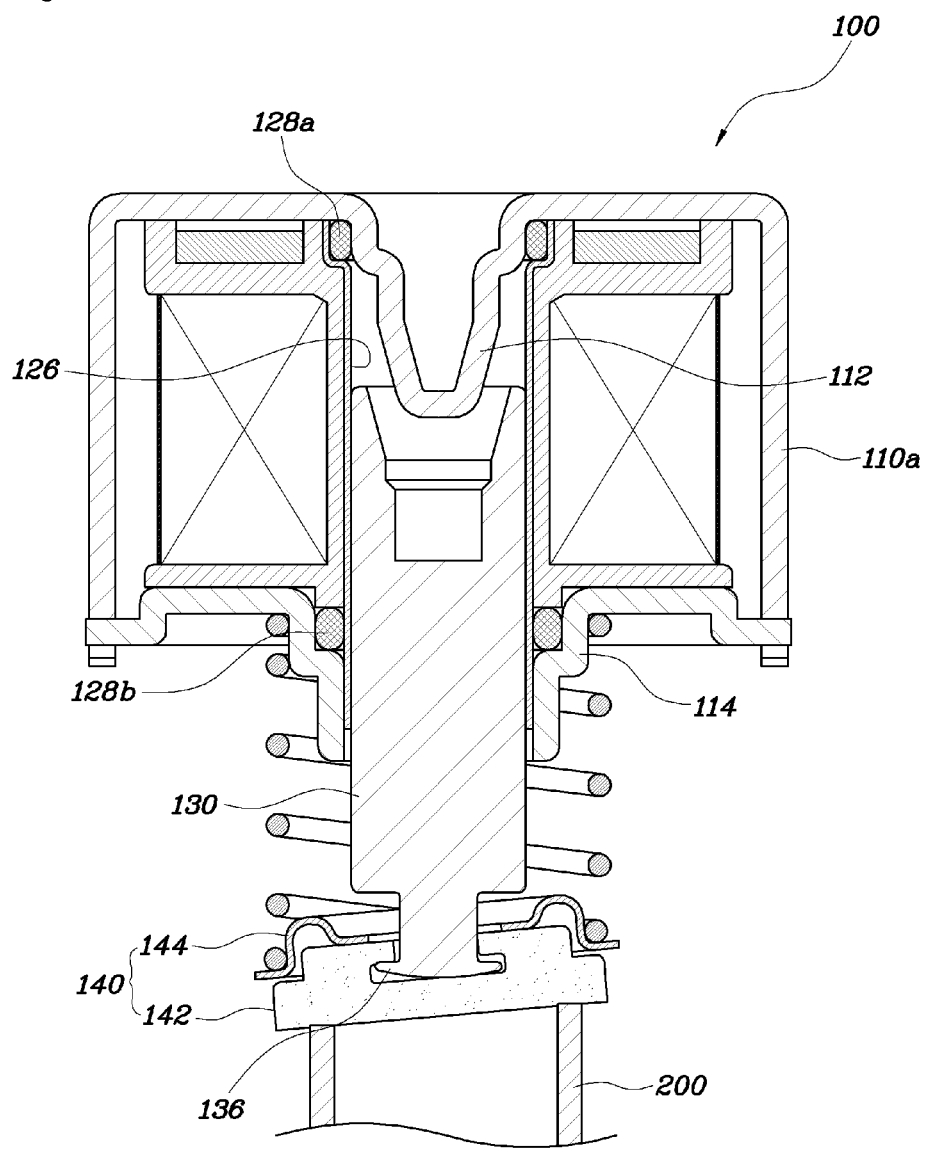
FIG. 4 is a diagram illustrating a use state of the gas control unit for a boiler according to the embodiment of the invention.

According to the above-mentioned configuration of this embodiment, since the elastic pad 142 opening and shutting the gas outlet (200 in FIG. 4) is coupled to the rod 130 through the use of the coupling member 136 and the coupling groove 146, the opening and shutting means can move within a predetermined range about the coupling member 136 with the application of an external force. For example, as shown in FIG. 4, when the top end of the gas outlet 200 has a stepped portion, the elastic pad 142 rotates about the coupling member 136 to shut the gas outlet 200. Accordingly, it is possible to satisfactorily control the supply and shut-off of gas via the gas outlet 200. In addition, even when the center of the rod 130 including the opening and shutting means 140 slightly departs from the center of the gas outlet 200, it is possible to satisfactorily open and shut the gas outlet 200.

In the gas control unit 100 for a boiler according to this embodiment, the magnetic induction protrusion 112 is formed in a body along with the first plate 110a and the O-rings 128a and 128b are disposed between the guide 126 and the magnetic induction protrusion 112 and between the guide 126 and the first attachment protrusion 114. Accordingly, it is possible to prevent the gas leakage from the gas control unit 100 for a boiler, thereby enhancing the safety.

Figure 5:
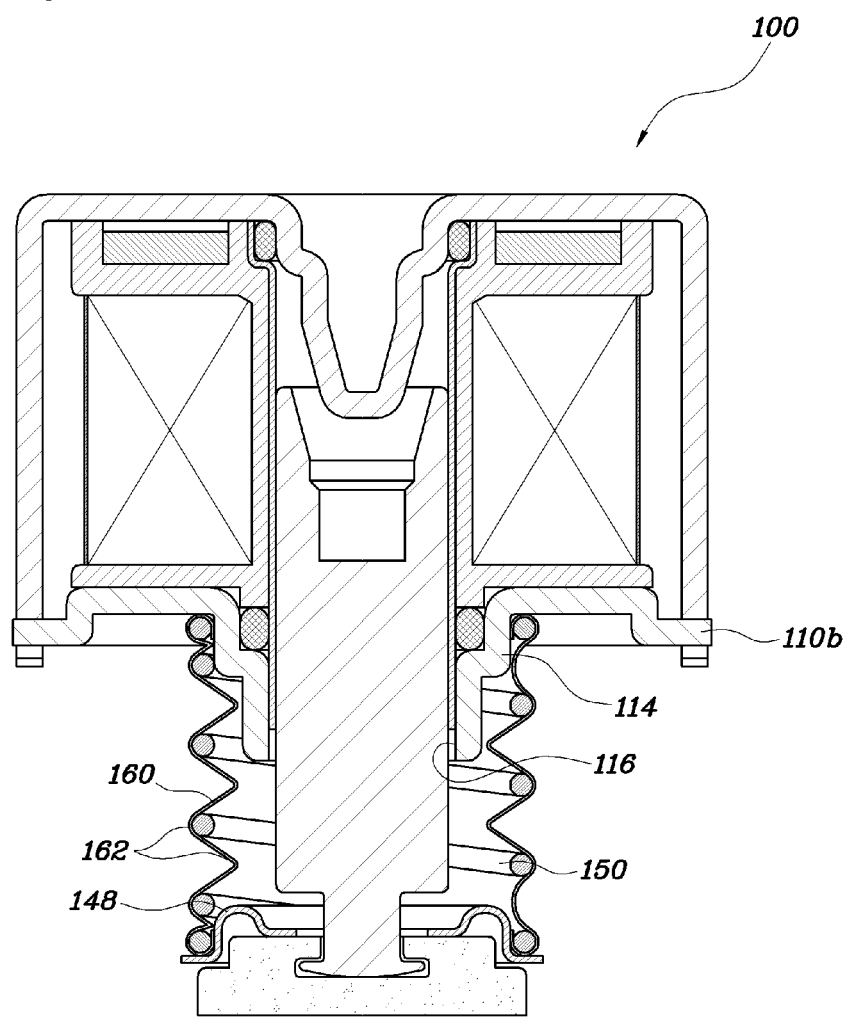
FIG. 5 is a sectional view of a gas control unit for a boiler according to another embodiment of the invention.

FIG. 5 is a diagram illustrating a gas control unit 100 for a boiler according to another embodiment of the invention.

As shown in FIG. 5, the gas control unit 100 for a boiler according to another embodiment of the invention further includes a bellows 160 surrounding the outer circumferential surface of the spring 150. The bellows 160 serves to prevent the leakage of gas between the through-hole 116 formed in the second plate 110b and the rod 130 disposed in the through-hole 116. The bellows 160 has a tubular shape having plural pleats 162 formed therein so as to be stretched or contracted when the rod 130 moves. Here, the pleats 162 of the bellows 160 are formed along the spirals of the spring 150 and the spirals of the spring 150 are bonded to the insides of the pleats 162 having a larger diameter. Particularly, the top and bottom ends of the bellows 160 are formed to surround the top and bottom ends of the spring 150 so as to perfectly prevent the leakage of gas.

Figure 6:
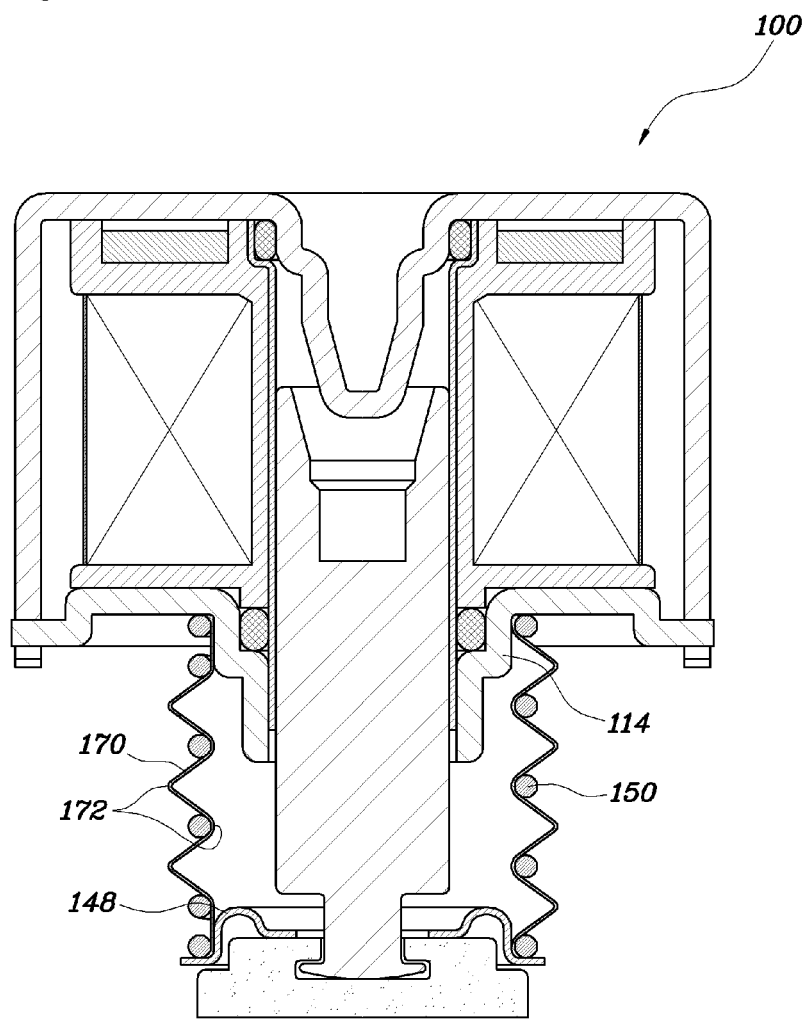
FIG. 6 is a sectional view of a gas control unit for a boiler according to still another embodiment of the invention.

A gas control unit 100 for a boiler according to still another embodiment of the invention will be described with reference to FIG. 6. The gas control unit further includes a bellows 170 located inside the spring 150. The bellows 170 has a tubular shape having plural pleats 172 formed therein, which is the same shape as the above-mentioned bellows (160 in FIG. 5). The spirals of the spring 150 are located outside the pleats 172 having a smaller diameter. Here, the top end of the bellows 170 is disposed between the first attachment protrusion 114 and the top and of the spring 150 and the bottom end is disposed between the second attachment protrusion 148 and the bottom end of the spring 150. Accordingly, it is possible to perfectly prevent the leakage of gas.

While the exemplary embodiments of the invention have been described with the accompanying drawings, the embodiments are only examples of the technical concept of the invention. It will be understood well by those skilled in the art that the invention can be modified in various forms without departing from the technical concept of the invention. Therefore, the protective scope of the invention should be analyzed by the description of the appended claims, not by the exemplary embodiments, and all the technical concepts equivalent to the description of the claims should belong to the scope of the invention.

The invention claimed is:

1. A gas control unit for a boiler comprising:
   a hollow housing;
   a solenoid that is disposed in the housing;
   a rod that is inserted into the solenoid and that has a lower part protruding from the housing;
   opening and shutting means that is disposed at the lower end of the rod so as to open and shut a gas outlet;
   a spring that is disposed between the housing and the opening and shutting means so as to elastically urge the opening and shutting means downward,
   wherein a coupling member is formed at the lower end of the rod and a coupling groove into which the coupling member is inserted is formed in the opening and shutting means so as to allow the opening and shutting means to move;
   wherein a first attachment protrusion is formed on the bottom surface of the housing, a second attachment protrusion is formed on the top surface of the opening and shutting means, and the upper end and the lower end of the spring are inserted onto the first attachment protrusion and the second attachment protrusion, respectively;
   wherein the opening and shutting means includes an elastic pad that has the coupling groove formed therein and a cover that is disposed on the top of the elastic pad and that has the second attachment protrusion formed therein;
   wherein the housing includes a C-shaped first plate of which the bottom surface is opened and a panel-shaped second plate that is coupled to the opened bottom surface of the first plate; and
   wherein a magnetic induction protrusion that is inserted into the solenoid is formed at the center of the first plate and a magnetic induction groove corresponding to the magnetic induction protrusion is formed in the rod.

2. The gas control unit for a boiler according to claim 1, wherein an extension having a diameter smaller than the diameters of the rod and the coupling member is formed between the lower end of the rod and the coupling member and the opening of the coupling groove has a diameter sufficient to cover the top surface of the coupling member.

3. The gas control unit for a boiler according to claim 2, wherein the bottom surface of the coupling member is curved.

4. The gas control unit for a boiler according to claim 1, wherein the solenoid includes a bobbin that has an insertion hole into which the magnetic induction protrusion and the rod are inserted from the upside and the downside, respectively, a tubular guide that is disposed in the insertion hole to extend up to the first attachment protrusion, a coil that is wound on the outer circumferential surface of the bobbin to generate a magnetic field with an application of a voltage, a first O-ring that is disposed between the top end of the guide and the magnetic induction protrusion, and a second O-ring that is disposed between the bottom end of the guide and the first attachment protrusion.

5. The gas control unit for a boiler according to claim 4, further comprising a bellows that surrounds the outer circumferential surface of the spring,
   wherein pleats of the bellows are formed along spirals of the spring.

6. The gas control unit for a boiler according to claim 4, further comprising a bellows that is disposed inside the spring,
   wherein the top end and the bottom end of the bellows are coupled to the first attachment protrusion and the second attachment protrusion and are fixed by the spring.

* * * * *